US007496126B2

United States Patent
Kubo et al.

(10) Patent No.: US 7,496,126 B2
(45) Date of Patent: Feb. 24, 2009

(54) GAS LASER OSCILLATOR AND METHOD OF MEASURING LASER GAS REPLACEMENT AMOUNT

(75) Inventors: Yoshitaka Kubo, Yamanashi (JP); Toshiyasu Shiomi, Yamanashi (JP); Akira Egawa, Gotenba (JP); Kazuhiro Suzuki, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 11/700,768

(22) Filed: Feb. 1, 2007

(65) Prior Publication Data

US 2007/0177649 A1  Aug. 2, 2007

(30) Foreign Application Priority Data

Feb. 2, 2006 (JP) ............................. 2006-025499

(51) Int. Cl.
*H01S 3/22* (2006.01)
(52) U.S. Cl. .............................. 372/59; 372/55; 372/58
(58) Field of Classification Search .................. 372/55, 372/58, 59, 57, 61
See application file for complete search history.

(56) References Cited

U.S. PATENT DOCUMENTS 5,088,101 A * 2/1992 Irie et al. ....................... 372/59

FOREIGN PATENT DOCUMENTS

| JP | 62-118587 | 5/1987 |
|---|---|---|
| JP | 1-158787 | 6/1989 |
| JP | 7-176809 | 7/1995 |
| JP | 11-87809 | 3/1999 |
| JP | 2002-319724 | 10/2002 |

OTHER PUBLICATIONS

European Search Report dated Jun. 4, 2007 issued in European Application No. 07002222.3-2222.

* cited by examiner

*Primary Examiner*—Armando Rodriguez
(74) *Attorney, Agent, or Firm*—Drinker Biddle & Reath LLP (57) ABSTRACT

A gas laser oscillator includes a supply-side valve for regulating a laser gas supply to a gas chamber, an exhaust-side valve for regulating a laser gas exhaust from the gas chamber, a gas pressure measuring device for measuring a pressure in the gas chamber, and a control device functioning as a laser gas replacement measuring device. The control device makes a first measurement and a second measurement of the pressure in the gas chamber by a gas pressure measuring device at a predetermined time interval during the vacuuming or purging of the gas chamber, and determines the laser gas replacement amount per unit time during the laser oscillating operation, based on the results of the first and second measurements.

7 Claims, 8 Drawing Sheets

GAS LASER OSCILLATOR AND METHOD OF MEASURING LASER GAS REPLACEMENT AMOUNT

BACKGROUND OF THE INVENTION

1. Field of the Invention

The present invention relates to a method of measuring an amount of laser gas replaced per unit time in a gas laser oscillator for exciting the laser gas to generate laser light, and a gas laser oscillator capable of measuring the laser gas replacement amount by the method.

2. Description of the Related Art

In a laser processing machine etc., a gas laser oscillator is used to generate laser light. For example, in the carbon dioxide gas laser oscillator, laser gas composed of $CO_2$, $N_2$, He, etc. is filled in a gas chamber, and a high voltage is applied to the laser gas thereby to generate a discharge. By use of this discharge, the laser gas (or more specifically, $CO_2$) is excited, and the light emitted from the laser gas is resonated by an optical resonator thereby to generate laser light.

At the time of discharge, the carbon dioxide in the laser gas is dissociated to generate CO, $O_2$ and $O_3^-$, and $NO_x$ is further generated by a reaction between $O_3^-$ and $N_2$. The continuation of the laser oscillating operation increases the amount of those products in the gas chamber with time. As a result, the percentage composition of the laser gas gradually changes from the initial state, thereby reducing the laser power. In order to solve this problem, in the prior art, the laser gas in the gas chamber is replaced with a new laser gas in a predetermined amount at some point in time during the laser oscillating operation. Also, in order to stabilize the discharge, and hence the laser power, the laser gas in the gas chamber is required to be maintained at a predetermined pressure (for example, 0.05 to 0.2 atmospheric pressure in terms of absolute pressure). Therefore, as described in Japanese Unexamined Patent Publication No. 7-176809, the supply and exhaust of the laser gas to and from the gas chamber are controlled, at the time of replacing the gas, so as to maintain the laser gas in the gas chamber at a predetermined pressure.

As described above, in the gas laser oscillator, the laser gas in the gas chamber is required to be replaced while at the same time maintaining the laser gas in the gas chamber at a predetermined pressure. Therefore, it is ideal to control both the pressure of the laser gas in the gas chamber and the replacement amount of the laser gas per unit time. However, realization of such control requires a gas pressure measuring device for measuring the pressure of the laser gas in the gas chamber, a gas flowmeter for measuring the flow rate of the laser gas supplied to or exhausted from the gas chamber, a supply-side valve such as a proportional solenoid valve for regulating the supply of the laser gas to the gas chamber, and an exhaust-side valve such as a proportional solenoid valve for regulating the exhaust of the laser gas from the gas chamber, resulting in increased production cost for the gas laser oscillator.

Even in the case where the laser gas replacement amount per unit time changes, various characteristics including the laser power do not change greatly within a short time, and a small change in the laser gas replacement amount per unit time has no great effect on the characteristics including the laser power. Therefore, a control system giving priority to the production cost is generally employed in which the laser gas replacement amount per unit time is regulated in advance by a manual valve or the like, and no regulation is made subsequently while controlling only the laser gas pressure in the gas chamber at a predetermined value.

In the case where the units affecting the laser gas replacement amount such as an exhaust pump or a laser gas exhaust passage for exhausting the laser gas in the gas chamber are degenerated or replaced, the laser gas replacement amount is changed. If the laser gas replacement amount decreases in this process, the percentage composition of the laser gas would be changed, thereby reducing the laser power. On the other hand, if the laser gas replacement amount increases in that process, the laser gas consumption would be increased, resulting in an increased running cost. Therefore, the laser gas replacement amount is required at a proper level. However, in an ordinary gas laser oscillator, the laser gas replacement amount is not controlled by the laser oscillator during the laser oscillating operation. Instead, the laser gas replacement amount is regulated in advance, and only the laser gas pressure in the gas chamber is controlled so as to be at a predetermined value during the laser oscillating operation. Therefore, the ordinary laser oscillator is not provided with a gas flowmeter, as described above. In order to regulate the laser gas replacement amount, the gas flowmeter is required to be prepared and mounted at a specified measurement position of the laser oscillator in order to check the laser gas replacement amount and, if necessary, repeat the regulation of the laser gas replacement amount. Also, after regulation, the gas flowmeter is required to be removed again. Thus, in the prior art, the regulation of the laser gas replacement amount requires many more steps.

Further, the gas flowmeter is so expensive that the purchase thereof for maintenance by the gas laser oscillator user would be a large financial burden. For this reason, it is common practice for a specialist to carry his/her own gas flowmeter in order to perform the job of regulating the gas replacement amount.

SUMMARY OF THE INVENTION

Accordingly, it is an object of the present invention to make it possible to determine the laser gas replacement amount per unit time in a gas laser oscillator without using a gas flowmeter.

According to the first aspect of the present invention, there is provided a gas laser oscillator including a gas chamber for containing a laser gas, a supply-side valve for regulating a supply of the laser gas to the gas chamber, an exhaust-side valve for regulating an exhaust of the laser gas from the gas chamber, and a gas pressure measuring device for measuring pressure in the gas chamber, the laser gas in the gas chamber being replaced while controlling the supply-side valve, and the exhaust-side valve during the time of generating a laser light by exciting the laser gas in the gas chamber, wherein the gas laser oscillator further includes a laser gas replacement amount measuring device, the laser gas replacement amount measuring device making a first measurement and a second measurement of the pressure in the gas chamber by means of the gas pressure measuring device at a predetermined time interval either when the laser gas in the gas chamber is exhausted by closing the supply-side valve with the exhaust-side valve opened or when the gas chamber is purged by closing the exhaust-side valve with the supply-side valve opened after the exhausting of the gas chamber, and determining the laser gas replacement amount per unit time during the laser oscillating operation based on the results of the first and second measurements.

In the gas laser oscillator described above, the laser gas pressure in the gas chamber is measured twice at a predetermined time interval either when the laser gas is exhausted from the gas chamber with the supply of the laser gas to the gas chamber stopped, and the laser gas replacement amount pet unit time during the laser oscillating operation is determined based on the results of the two measurements. Therefore, an expensive gas flowmeter is not necessary to determine the laser gas replacement amount per unit time.

For example, when P0 is an average pressure of the laser gas in the gas chamber during the laser oscillating operation, V0 is a volume of the gas chamber, t1 is a time of the first measurement, t2 is a time of the second measurement, P1 is a pressure in the gas chamber measured by the gas pressure measuring device at time t1, P2 is a pressure in the gas chamber measured by the gas pressure measuring device at time t2, and Q is the laser gas replacement amount per unit time, the laser gas replacement amount measuring device can determine the laser gas replacement amount Q per unit time from the pressure in the gas chamber measured during the exhausting process by the following equation:

$$Q = P0 \cdot V0/(t2-t1) \cdot \ln(P1/P2).$$

Also, when V0 is a volume of the gas chamber, t1 is a time of the first measurement, t2 is a time of the second measurement, P1 is a pressure in the gas chamber measured by the gas pressure measuring device at time t1, P2 is a pressure in the gas chamber measured by the gas pressure measuring device at time t2, and Q is the laser gas replacement amount per unit time, the laser gas replacement amount measuring device can determine the laser gas replacement amount Q per unit time from the pressure in the gas chamber measured during the purging process by the following equation:

$$Q = V0 \cdot (P2-P1)/(t2-t1).$$

Preferably, the gas laser oscillator further includes a display device for displaying the laser gas replacement amount per unit time determined by the laser gas replacement amount measuring device. More preferably, the gas laser oscillator further includes a storage device for storing the laser gas replacement amount per unit time determined by the laser gas replacement amount measuring unit, and the laser gas replacement amount per unit time stored in the storage device is displayed on the display device.

Further, the laser gas replacement amount measuring unit preferably automatically measures the laser gas replacement amount when laser gas is exhausted from the gas chamber.

According to the second aspect of the present invention, there is provided a method of measuring a laser gas replacement amount per unit time during a laser oscillating operation in a gas laser oscillator in which the laser gas in the gas chamber is replaced while controlling a supply of the laser gas to the gas chamber and an exhaust of the laser gas from the gas chamber during the time of generating a laser light by exciting the laser gas in the gas chamber, which includes the steps of: stopping the supply of the laser gas to the gas chamber: exhausting the laser gas in the gas chamber with the laser gas supply to the gas chamber stopped; making a first measurement of the pressure in the gas chamber in the exhausting step; making a second measurement of the pressure in the gas chamber at a predetermined time interval from the first measurement; and determining the laser gas replacement amount per unit time during the laser oscillation operation, based on the results of the first and second measurements.

Similarly, when P0 is an average pressure of the laser gas in the gas chamber during the laser oscillating operation, V0 is a volume of the gas chamber, t1 is a time of the first measurement, t2 is a time of the second measurement, P1 is a pressure in the gas chamber measured at time t1, P2 is a pressure in the gas chamber measured at time t2, and Q is the laser gas replacement amount per unit time, the laser gas replacement amount Q per unit time can be determined from the pressure in the gas chamber measured during the exhausting step by the following equation:

$$Q = P0 \cdot V0/(t2-t1) \cdot \ln(P1/P2).$$

According to the third aspect of the present invention, there is provided a method of measuring a laser gas replacement amount per unit time during a gas oscillating operation in a gas laser oscillator in which the laser gas in the gas chamber is replaced while controlling a supply of the laser gas to the gas chamber and an exhaust of the laser gas from the gas chamber during the time of generating a laser light by exciting the laser gas in the gas chamber, which includes the steps of: stopping the supply of the laser gas to the gas chamber; exhausting the laser gas in the gas chamber with the laser gas supply to the gas chamber stopped; purging the gas chamber by supplying the laser gas to the gas chamber with the exhaust of the laser gas from the gas chamber stopped, after the exhausting step; making a first measurement of the pressure in the gas chamber in the purging step; making a second measurement of the pressure in the gas chamber at a predetermined time interval from the first measurement; and determining the laser gas replacement amount per unit time during the laser oscillation operation, based on the results of the first and second measurements.

Also, when V0 is a volume of the gas chamber, t1 is a time of the first measurement, t2 is a time of the second measurement, P1 is a pressure in the gas chamber measured at time t1, P2 is a pressure in the gas chamber measured at time t2, and Q is the laser gas replacement amount per unit time, the laser gas replacement amount Q per unit time can be determined from the pressure in the gas chamber measured during the purging step by the following equation:

$$Q = V0 \cdot (P2-P1)/(t2-t1).$$

According to the present invention, a laser gas replacement amount can be determined in a gas laser oscillator without using a gas flowmeter. As a result, an expensive gas flowmeter is not necessary to regulate the laser gas replacement amount, thereby contributing to reduced cost. Also, an elimination of the need of mounting and demounting a gas flowmeter can not only reduce the number of steps for regulating the laser gas replacement amount, but also can automate the measurement of the laser gas replacement amount.

BRIEF DESCRIPTION OF THE DRAWINGS

The above and other objects, features and advantages of the present invention will be described in more detail below based on the preferred embodiments of the present invention with reference to the accompanying drawings, in which.

DETAILED DESCRIPTION

The preferred embodiments of the present invention will be described below with reference to the drawings.

Figure 1:
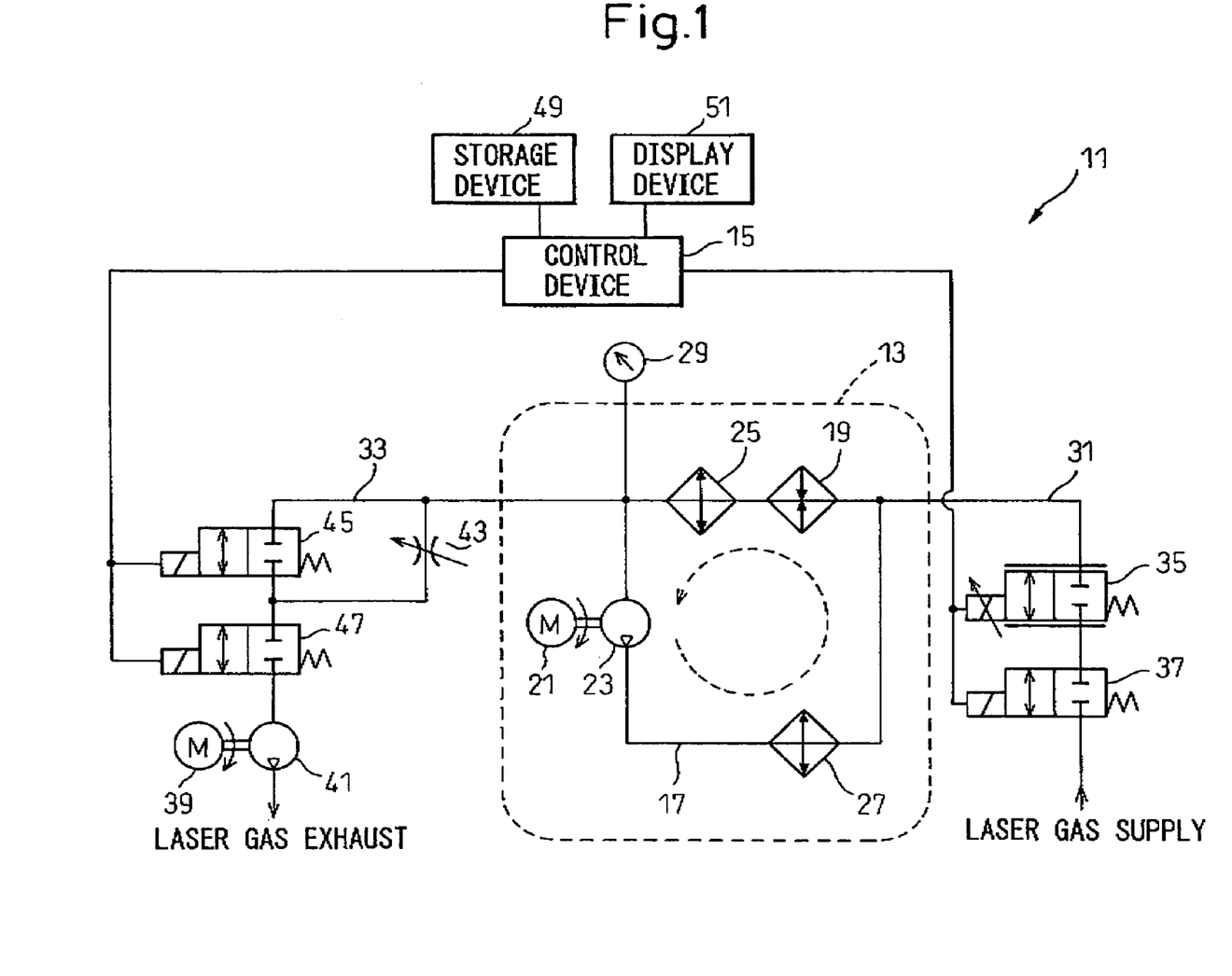
FIG. 1 is a schematic diagram showing a configuration of a gas laser oscillator according to a first embodiment of the present invention.

Referring to FIG. 1, a gas laser oscillator 11 according to the present invention includes a gas chamber 13 for containing laser gas, a control device 15 for controlling an operation of the gas laser oscillator 11, a storage device 49 for storing data, and a display device 51 for displaying data. A laser gas circulation passage 17 through which the laser gas flows is provided in the gas chamber 13. The laser gas circulation passage 17 has disposed therein a discharge tube 19, a blower 23 driven by a motor 21, a first heat exchanger 25, a second heat exchanger 27 and a gas pressure measuring device 29.

In the discharge tube 19, the laser gas in the laser gas circulation passage 17 is excited by high voltage applied thereto to cause a discharge and generate laser light. The blower 23 forcibly circulates the laser gas in the laser gas circulation passage 17 and thereby suppresses the temperature increase of the laser gas in the gas chamber 13 which otherwise might be caused by the discharge. The first heat exchanger 25 is arranged downstream of the discharge tube 19 in the laser gas circulation passage 17 in order to cool the laser gas by recovering the heat of the laser gas increased in temperature by the discharge. On the other hand, the second heat exchanger 27 is arranged downstream of the blower 23 in the laser gas circulation passage 17 in order to cool the laser gas by recovering the heat of the laser gas which is compressed by the blower 23 and increased in temperature. The gas pressure measuring device 29 is arranged upstream of the blower 23 in the laser gas circulation passage 17, and is adapted to monitor and measure the pressure of the laser gas in the gas chamber 17. The configuration and the operation of the gas chamber described above are similar to those of a conventional gas laser oscillator, and therefore are not described in detail.

Further, the gas chamber 13 is connected to a laser gas supply passage 31 for supplying laser gas and a laser gas exhaust passage 33 for exhausting laser gas. The laser gas supply passage 31 extends from a laser gas source (not shown), such as a compressed gas cylinder in which high-pressure laser gas is stored. A supply-side throttle valve 35 for regulating an amount of the laser gas supplied to the gas chamber 13 is provided on the laser gas passage 31, and a proportional solenoid valve is used as the supply-side throttle valve 35. However, a proportional solenoid valve used as the supply-side throttle valve 35 generally does not have sufficient seal performance for the primary and secondary sides thereof. Therefore, when a method of measuring a laser gas replacement amount according to the present invention as described later is executed, the laser gas supply to the gas chamber 13 may not be completely stopped, thereby adversely affecting the accurate measurement of the laser gas replacement amount. In view of this, in the gas laser oscillator 11 according to the first embodiment, a supply-side on/off valve 37 is provided upstream (laser gas source side) of the supply-side throttle valve 35 for the purpose of making it possible to completely stop the laser gas supply to the gas chamber 13, and a solenoid valve of two-position switching type is used as the supply-side on/off valve 37.

Also, the laser gas exhaust passage 33 is connected to an exhaust pump 41, such as a vacuum pump driven by a motor 39. An exhaust-side throttle valve 43 for regulating an amount of laser gas exhausted from the gas chamber 13 is provided on the laser gas exhaust passage 33, and a manual throttle valve is used as the exhaust-side throttle valve 43. The laser gas exhaust passage 33 is further connected to a first exhaust-side on/off valve 45 in parallel to the exhaust-side throttle valve 43. A second exhaust-side on/off valve 47 is connected to the downstream side (far from the gas chamber) of the exhaust-side throttle valve 43 and the first exhaust-side on/off valve 45. Solenoid valves of a two-position switching type are used as the first exhaust-side on/off valve 45 and the second exhaust-side on/off valve 47.

The first exhaust-side on/off valve 45 is disposed for the purpose of securing a sufficient exhaust rate when the laser gas is exhausted from the gas chamber 13 for vacuuming carried out, for example, at the time of the starting-up of the gas laser oscillator 11. The first exhaust-side on/off valve 45 is fully opened in the vacuuming process for the laser gas in the gas chamber 13, while it is closed during the laser oscillating operation. Therefore, since the laser gas in the gas chamber 13 is exhausted through the exhaust-side throttle valve 43 and the second exhaust-side on/off valve 47 during the laser oscillating operation, the amount of the laser gas flowing through the exhaust-side throttle valve 43 during the laser oscillating operation corresponds to a laser gas replacement amount described later. On the other hand, the second exhaust-side on/off valve 47 is disposed for the purpose, of fully stopping the exhaust of the laser gas from the gas chamber 13 at the time of executing a method of measuring the laser gas replacement amount according to the present invention described later. In order to secure a sufficient exhaust rate in the vacuuming process, the first exhaust-side on/off valve 45 and the second exhaust-side on/off valve 47 preferably have a larger effective cross section than the exhaust-side throttle valve 43.

The operations of the supply-side throttle valve 45 constituted by the proportional solenoid valve, the supply-side on/off valve 37 constituted by the solenoid valve of two-position switching type, the first exhaust-side on/off valve 45 and the second exhaust-side on/off valve 47 can be controlled by the control device 15.

Next, the principle of measuring the laser gas replacement amount in the gas laser oscillator 11 according to the first embodiment described above will be described below.

Figure 2:
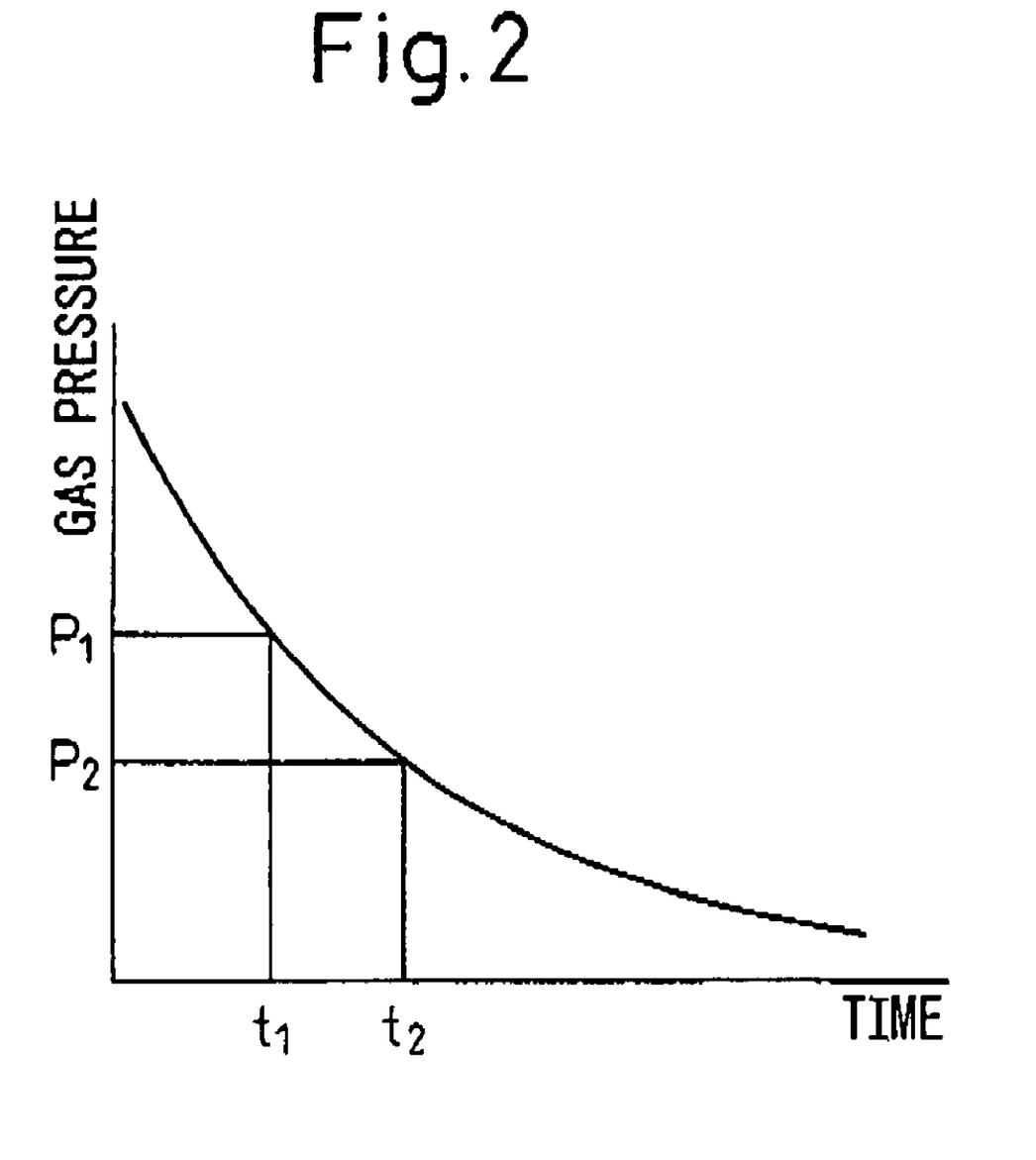
FIG. 2 is a graph showing a pressure change when laser gas is exhausted from a gas chamber of the gas laser oscillator shown in FIG. 1.

In the configuration of the gas laser oscillator 11 according to the first embodiment, an amount of the laser gas in the gas chamber 13, which is replaced per unit time, i.e. the laser gas replacement amount, is determined by the effective cross section of the gas exhaust system regulated by the manually-operated exhaust-side throttle valve 43 and the exhaust capacity of the exhaust pump 41. When the supply-side on/off valve 37 is closed while continuing to exhaust the laser gas through the exhaust pump 41, the laser gas supply passage 31 is closed off and the laser gas supply to the gas chamber 13 is stopped. Therefore, the laser gas pressure in the gas chamber 13 is gradually decreased as shown in FIG. 2. Thus, assuming that the average pressure P of the laser gas in the gas chamber 13 has dropped by dp after a lapse of time dt, the following differential equation (1) is obtained.

$$-dp \cdot V0 = p \cdot Q_{EP} \cdot dt \tag{1}$$

where V0 is the volume of the gas chamber 13 and $Q_{EP}$ is the exhaust rate of the exhaust pump 41 during the operation before conversion into an exhaust rate under one atmospheric pressure. The exhaust rate $Q_{EP}$ of the exhaust pump 41 is constant due to the characteristics of the exhaust pump 41. However, since the average pressure of the laser gas in the gas chamber 13 changes, the converted exhaust rate under one atmospheric pressure changes in accordance with the change in the average pressure of the laser gas. Further, specifically, the volume V0 of the gas chamber 13 is indicative of the volume of the laser gas circulation passage 17.

The laser gas replacement amount Q per unit time can be determined from the following equation (2) obtained by solving the differential equation (1) under a condition in which the laser gas pressure in the gas chamber 13 measured by the gas pressure measuring device 29 changes from P1 to P2 during the period from time t1 to time t2 after the supply-side on/off valve 37 is closed off.

$$Q=[P0 \cdot V0/(t2-t1)] \cdot 1n(P1/P2) \qquad (2)$$

where P0 is the average pressure of the laser gas in the gas chamber 13 during the laser oscillating operation.

The average pressure P0 and the volume V0 have values unique to the gas laser oscillator of which the values can be predetermined. Therefore, by measuring the laser gas pressure P1 in the gas chamber 13 at time t1 and the laser gas pressure P2 in the gas chamber 13 at time t2, the laser gas replacement amount Q can be determined. Also, it is understood from equation (2) that what is required is a rate of change in the laser gas pressure at the same point for measurement. Specifically, it can be understood that, although the laser gas is circulated through the laser gas circulation passage 17 and that the laser gas pressure varies from one point to another point, an arbitrary point for measurement can be selected, as long as the laser gas pressure is always measured at the same point. It can also be understood that the laser gas may be observed without being circulated.

In the gas laser oscillator employing the method of measuring the laser gas replacement amount using equation (2) according to the present invention, under a state where the exhaust pump runs steadily in the same manner as in the laser oscillating operation, the control device 15 serving as a laser gas replacement amount measuring unit, fully closes the supply-side on/off valve 37 in order to close off the laser gas supply passage 31, while at the same time fully closing the first exhaust-side on/off valve 45 and fully opening the second exhaust-side on/off valve 47, thereby exhausting the laser gas in the gas chamber. This allows the laser gas to be exhausted from the gas chamber 13 through the exhaust-side throttle valve 43 and the second exhaust-side on/off valve 47, in the same manner as in the case where the laser gas in the gas chamber 13 is replaced during the laser oscillating operation, under the state where the supply to the gas chamber 13 is stopped. Under this condition, the control device 15 measures the laser gas pressure in the gas chamber twice at a predetermined time interval using the gas pressure measuring device 29 to thereby determine the laser gas replacement amount per unit time from the result of the two measurements.

Further, the control device 15 stores the determined laser gas replacement amount in a storage device 49 and, in response to the operator's request, reads the laser gas replacement amount from the storage device 49 and displays it on the display device 51. The operator, based on the laser gas replacement amount displayed on the display device 51, can operate the manual exhaust-side throttle valve 43 to regulate the laser gas replacement amount to a proper value.

Figure 3:
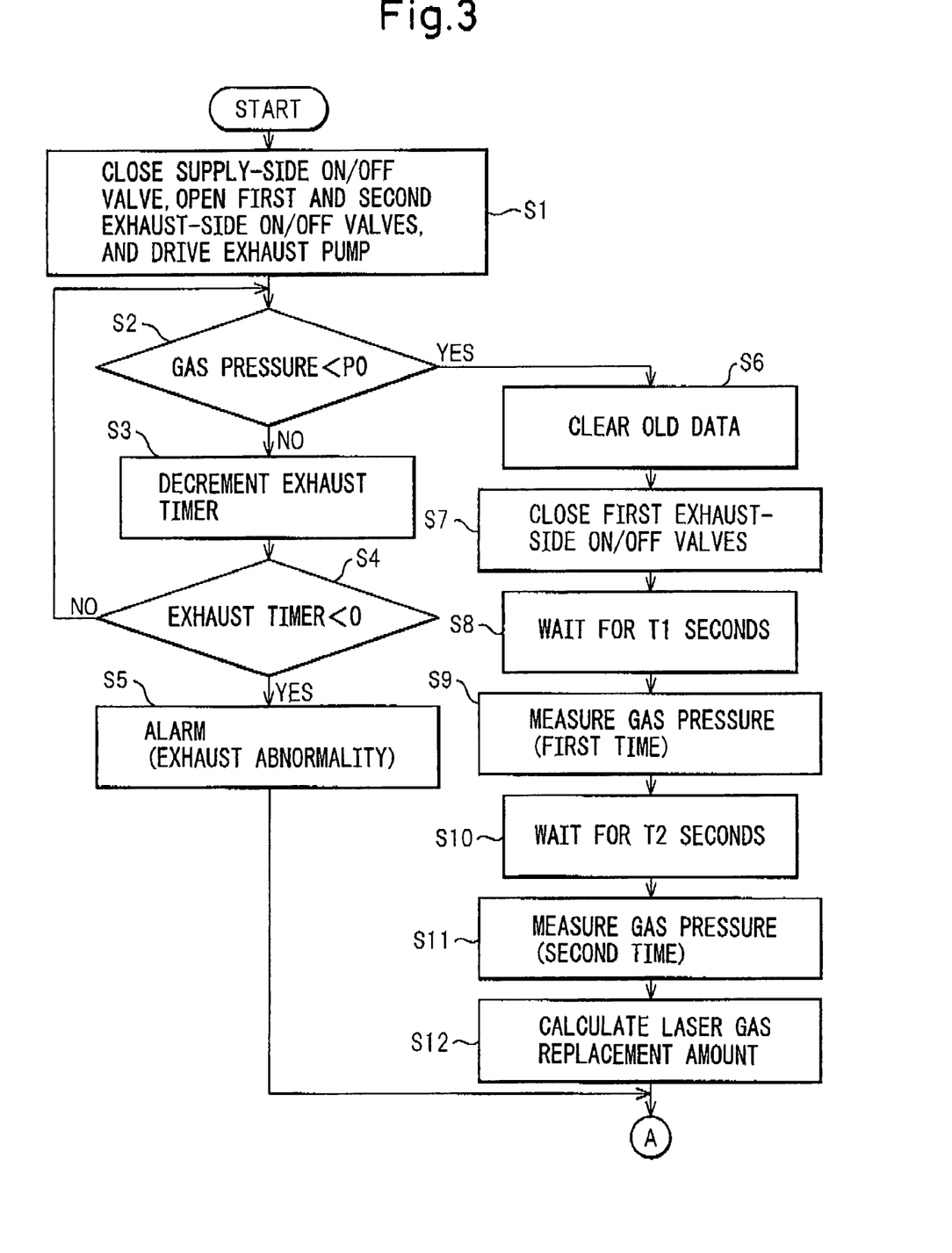
FIGS. 3 and 4 are flowcharts showing a procedure for determining a laser gas replacement amount per unit time based on the laser gas pressure in the gas chamber measured at the time of exhaust of the laser gas in the gas laser oscillator according to the first embodiment;.
Figure 4:
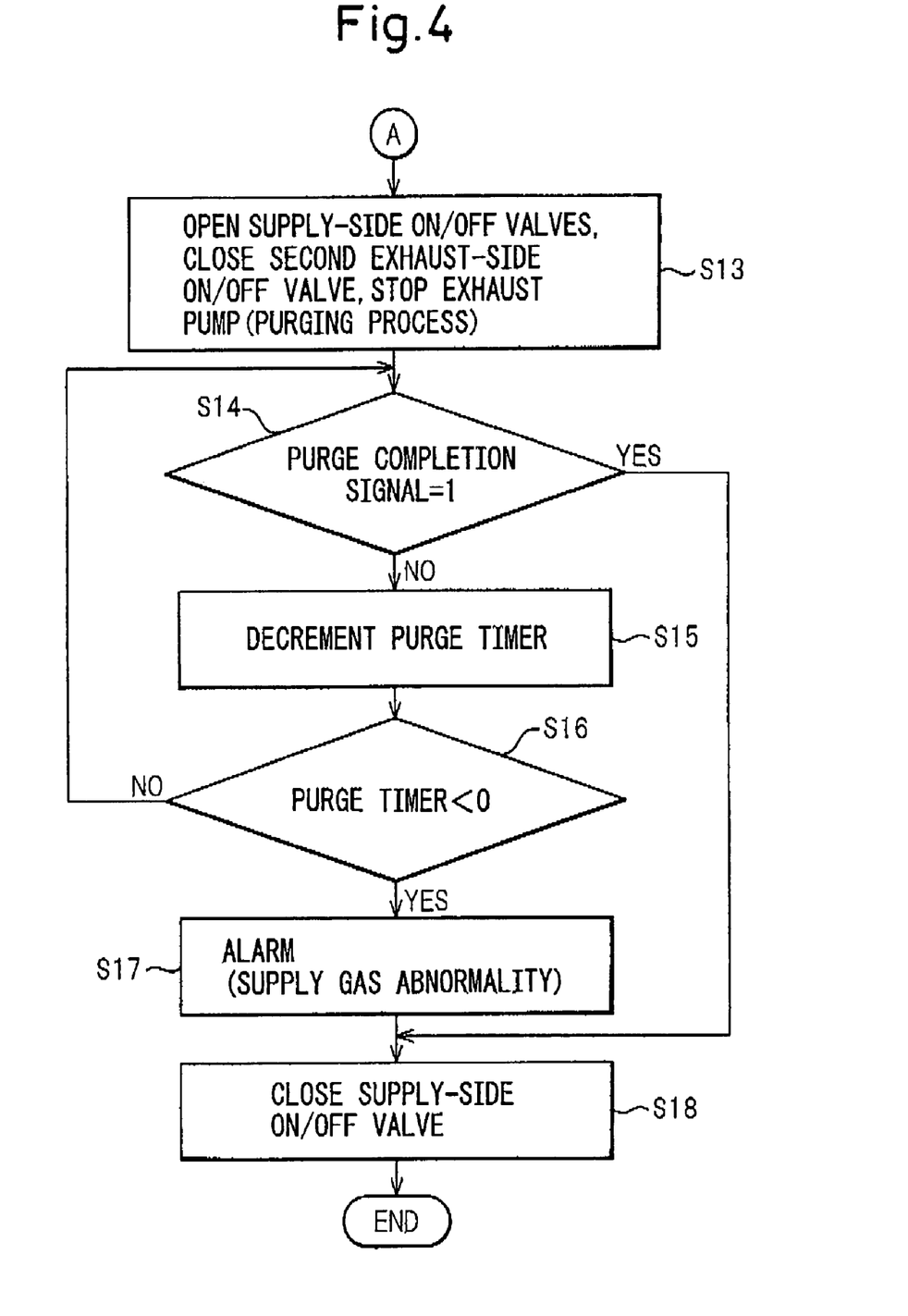

A method of measuring the laser gas replacement amount per unit time in the gas laser oscillator 11 shown in FIG. 1 will be described in detail below with reference to the flowcharts of FIGS. 3 and 4.

First, when the laser gas in the gas chamber 13 is exhausted by the exhaust pump 41 for vacuuming the gas chamber 13, the control device 15 closes the supply-side on/off valve 37, while at the same time opening the first exhaust-side on/off valve 45 and the second exhaust-side on/off valve 47. In this way, the laser gas is exhausted from the gas chamber 13 in the state where the laser gas supply is stopped (step S1). Next, the control device 15 receives the measurement of the laser gas pressure in the gas chamber 13 from the gas pressure measuring device 29, and compares it with, for example, a predetermined laser gas pressure set value P0 during the laser oscillating operation of the gas laser oscillator 11 (step S2).

When the laser gas pressure measured by the gas pressure measuring device 29 is higher than the laser gas pressure set value P0 in step S2, the value of the exhaust timer is decremented (step S3), thereby confirming that the value of the exhaust timer is not less than zero (step S4). If the value of the exhaust timer is not less than zero in step S4, the exhaust process is continued, and returning to step S2, the process of steps S2 to S4 is repeated. Also, if the value of the exhaust timer is less than zero in step S4, it means that the laser gas pressure does not decrease below the laser gas pressure set value P0 despite the lapse of the preset exhaust time. Therefore, an alarm (exhaust abnormality) is displayed on the display device 51, and the process proceeds to step S13 described later (step S5). In this case, it is presumed that the exhaust pump 41 is out of order or that the laser gas is leaking from the gas chamber 13.

On the other hand, if the laser gas pressure in the gas chamber 13 measured by the gas pressure measuring device 29 is reduced to less than the predetermined laser gas pressure set value P0, the data obtained at the previous measurement and stored in the storage device 49 (the laser gas pressure measurement result and the determined laser gas replacement amount) and the old data displayed on the display device 51 are erased (step S6). Next, the first exhaust-side on/off valve 45 is fully closed (step S7). Then, the supply-side on/off valve 37 remains closed and the second exhaust-side on/off valve 47 remains open, so that the exhaust rate is reduced and the laser gas pressure in the gas chamber 13 changes gradually.

Next, in order to settle the internal state of the gas chamber 13, the control device 15, after fully closing the first exhaust-side on/off valve 45 and then waiting for a predetermined time T1 (for example, 5 seconds) (step S8), makes the gas pressure measuring device 29 measure the laser gas pressure in the gas chamber 13 at time t1 (step S9). The control device 15 receives the laser gas pressure measurement from the gas pressure measuring device 29, stores it in the storage device 49 and displays it on the display device 51. Next, the control device 15, after waiting for a predetermined time T2 (for example, 120 seconds) from the first measurement (step S10), makes the gas pressure measuring device 29 measure the laser gas pressure in the gas chamber 13 at time t2 (step S11). The control device 15 receives the laser gas pressure measurement from the gas pressure measuring device 29, stores it in the storage device 49 and displays it on the display device 51.

After the first and second measurements have been completed, the control device 15, using equation (2), calculates the laser gas replacement amount Q per unit time from the measurements of the laser gas in the gas chamber 13 at time points t1 and t2, the predetermined average pressure P0 of the laser gas in the gas chamber 13 during a laser oscillating operation, the known volume V0 of the gas chamber 13 and the waiting time T2(=t2−t1) in step S10 (step S12). The laser gas replacement amount Q per unit time obtained by the calculation is stored in the storage device 49 and displayed on the display device 51.

When measurement of the laser gas replacement amount Q has been completed, the control device 15 opens the supply-side on/off valve 37 to supply the laser gas to the gas chamber 13 while at the same time closing the second exhaust-side on/off valve 47 and stopping the exhaust pump 41, in order to start the process of purging the gas chamber 13 (step S13). In the process, the first exhaust-side on/off valve 45 is kept closed. Next, the control device 15 confirms the purge completion signal indicating that the pressure in the gas chamber 13 has reached atmospheric pressure and the purging process is complete (step S14). The purge completion signal may be output from a pressure switch (not shown) when the pressure in the gas chamber 13 reaches atmospheric pressure or may be output from the control device 15 when the output from the gas pressure measuring device 29 reaches atmospheric pressure.

When the control device 15 cannot confirm the purge completion signal in step S14, the purge timer is decremented (step S15) and the control device 15 confirms whether or not the value of the purge timer is equal to or more than zero (step S16). If the value of the purge timer is equal to or more than zero in step S16, the purge process is continued and the process returns to step S14 in order to repeat the process of steps S14 to S16. On the other hand, if the value of the purge timer is less than zero in step S16, it means that the gas chamber 13 is not purged despite the lapse of a preset purge time. Therefore, an alarm (supply gas abnormality) is displayed on the display device 51, and the process proceeds to step S18 described later (step S17). In this case, it is assumed that there will be leakage from the pipe supplying the laser gas to the gas chamber 13 or a drop in the laser gas source pressure.

On the other hand, when the control device 15 confirms the purge completion signal in step S14, the process proceeds to step S18 and the supply-side on/off valve 37 is closed to complete the purge process. By this time, the first exhaust-side on/off valve 45 and the second exhaust-side on/off valve 47 have already closed and the exhaust pump 41 has already stopped.

The control device 15 can function as a laser gas replacement amount measuring unit and measure the amount of the laser gas replaced in the gas chamber of the gas oscillator 11 per unit time without using the gas flowmeter. Also, since the laser gas pressure measurement and the determined laser gas replacement amount per unit time are stored in the storage device 49, they can be displayed and confirmed on the display device 51, if required.

Further, since the gas flowmeter is not required to be mounted on or demounted from the gas laser oscillator 11, as described above, the laser gas replacement amount can be automatically measured by the control device 15. Therefore, if the aforementioned process is incorporated into the starting sequence of the gas laser oscillator 11, for example, the laser gas replacement amount can be automatically measured at the time of starting the gas laser oscillator 11. Thus, even an unskilled operator could easily confirm and regulate the laser gas replacement amount per unit time. As a result, the stable operation of the gas laser oscillator is assured, and the laser gas cost is easily monitored. Also, since the operator has no working load, the operator is allowed to leave his/her working place, thereby contributing to reduced operational costs. Further, since an expensive gas flowmeter is not required for measuring the laser gas replacement amount, the maintenance cost of the gas laser oscillator can be reduced.

Although the gas laser oscillator 11 and the gas replacement amount measuring method according to the present invention have been described above with reference to the embodiment shown in FIG. 1, the present invention is not limited to the embodiment shown in FIG. 1. As in a gas laser oscillator 11' according to the second embodiment shown in FIG. 5, for example, the positions of the proportional solenoid valve used as the supply-side throttle valve and the manual valve used as the exhaust-side throttle valve in the first embodiment can be interchanged with each other. In the gas laser oscillator 11' according to the second embodiment shown in FIG. 5, a manual throttle valve is used as a supply-side throttle valve 35', and a proportional solenoid valve is used as an exhaust-side throttle valve 43', In this configuration, the laser gas replacement amount per unit time in the gas chamber 13 depends largely on the pressure of the laser gas supplied to the gas chamber 13, and therefore, a pressure reducing valve 53 is provided upstream of the manual valve used as the supply-side throttle valve 35' and the supply-side on/off valve 37, Alternatively, the pressure reducing valve 53 may be provided downstream of the supply-side throttle valve 35'. The other components are similar to those of the first embodiment, and common components are designated by the same reference numerals, respectively, as in the first embodiment.

Figure 5:
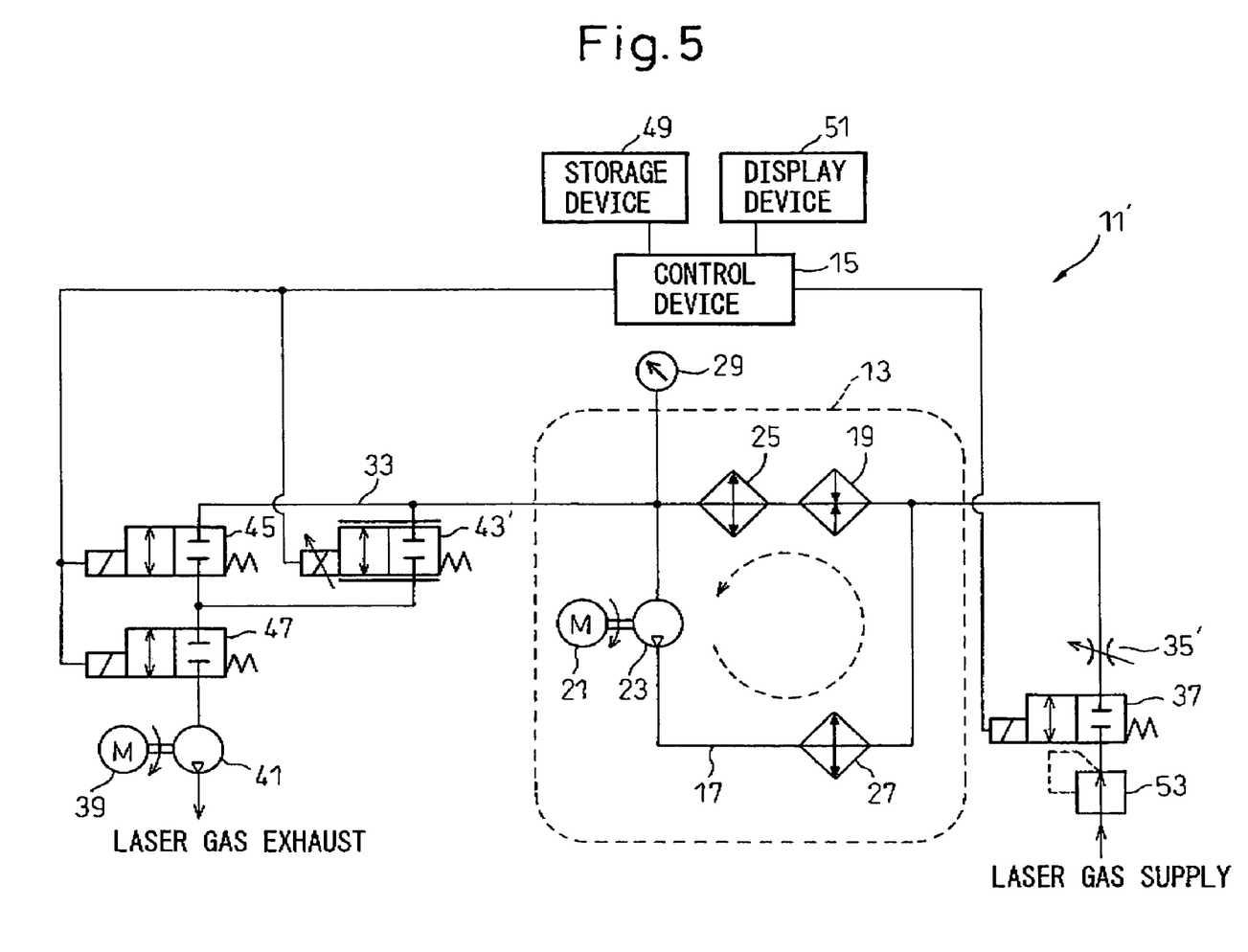
FIG. 5 is a schematic diagram showing a configuration of a gas laser oscillator according to a second embodiment of the present invention.

In the second embodiment, unlike in the first embodiment, the laser gas replacement amount is measured by measuring the laser gas pressure in the gas chamber 13 twice at a predetermined time interval when the gas chamber 13 is vacuumed and then purged (i.e. supplying the laser gas again to the gas chamber 13). The principle of measuring the laser gas replacement amount in the gas laser oscillator 11' according to the second embodiment will be described below.

Figure 6:
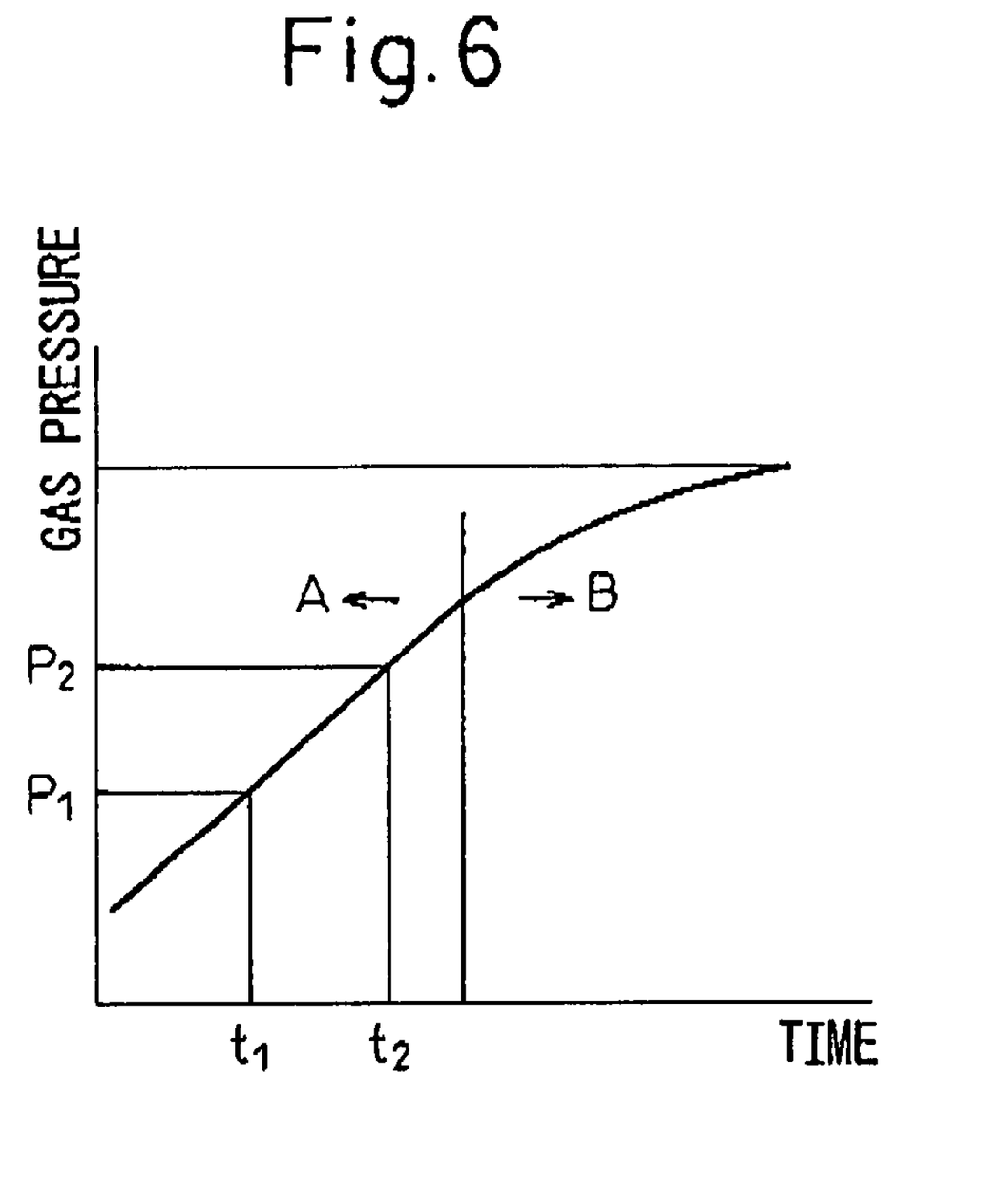
FIG. 6 is a graph showing a pressure change when an interior of a gas chamber of the gas laser oscillator shown in FIG. 5 is purged.

In the configuration of the gas laser oscillator 11' according to the second embodiment, the laser gas replacement amount is determined by the effective cross section of the intake system regulated by the manually operated supply-side throttle valve 35' and the secondary pressure of the pressure reducing valve. As described above in the explanation of the first embodiment, the pressure in the gas chamber 13 is gradually decreased as shown in FIG. 3 when the gas chamber 13 is vacuumed by exhausting the laser gas from the gas chamber 13 using the exhaust pump 41 with the supply-side on/off valve 37 closed and the first exhaust-side on/off valve 45 and the second exhaust-side on/off valve 47 opened. On the other hand, the laser gas pressure in the gas chamber 13 is gradually increased as shown in FIG. 6 when the gas chamber 13 is vacuumed and then purged by supplying the laser gas again into the gas chamber 13 with the supply-side on/off valve 37 opened and the first exhaust-side on/off valve 45 and the second exhaust-side on/off valve 47 closed.

In the second embodiment, the gas flow rate is reduced by the supply-side throttle valve 35'. Therefore, the laser gas pressure in the gas chamber 13 increases linearly in area A of FIG. 6. On the other hand, in area B of FIG. 6, the difference between the laser gas pressure in the gas chamber 13 and the secondary pressure of the pressure reducing valve 53 is decreased, so that the laser gas pressure rises more slowly with time. Therefore, assuming that the laser gas pressure in the gas chamber 13 measured by the gas pressure measuring device 29 changes from P1 to P2 between time t1 and time t2 in the area A of FIG. 6, the laser gas replacement amount Q per unit time is obtained by the following equation (3).

$$Q = V_0 \cdot (P_2 - P_1)/(t_2 - t_1) \quad (3)$$

where V0 is the volume of the gas chamber 13, or specifically, the volume of the laser gas circulation passage 17.

The volume V0 is a value unique to the gas laser oscillator 11, which can be predetermined. Therefore, the laser gas replacement amount Q can be determined by measuring the laser gas pressure P1 in the gas chamber 13 at time t1 and the laser gas pressure P2 in the gas chamber 13 at time t2. It should be noted that the measured laser gas pressure P1, P2 are required to be an average laser gas pressure in the gas chamber 13, i.e. in the laser gas circulation passage 17. However, during the purging process, the blower for circulating the laser gas in the laser gas circulation passage 17 is normally turned off, and no laser gas is circulated. Therefore, in this embodiment, the laser gas pressure measured by the gas pressure measuring device 29 can be regarded as the average pressure of the laser gas in the gas chamber 13.

Alternatively, an equation representing a relation between the laser gas replacement amount Q and the measured laser gas pressure P1, P2 in the area B of FIG. 6 or an equation representing a relation between the laser gas replacement amount Q and the measured laser gas pressure P1, P2 in the area covering both areas A and B of FIG. 6 may be obtained in advance, and the laser gas replacement amount Q may be determined from the measurements of the laser gas pressure P1, P2 based on the obtained equation. Another alternative, without regard to the equation representing such a relationship, the laser gas replacement amount Q may be determined from the measurements of the pressure P1, P2 by comparison with experimentally obtained data representing a relationship between the laser gas replacement amount Q and the measurements of the laser gas pressure P1, P2.

Figure 7:
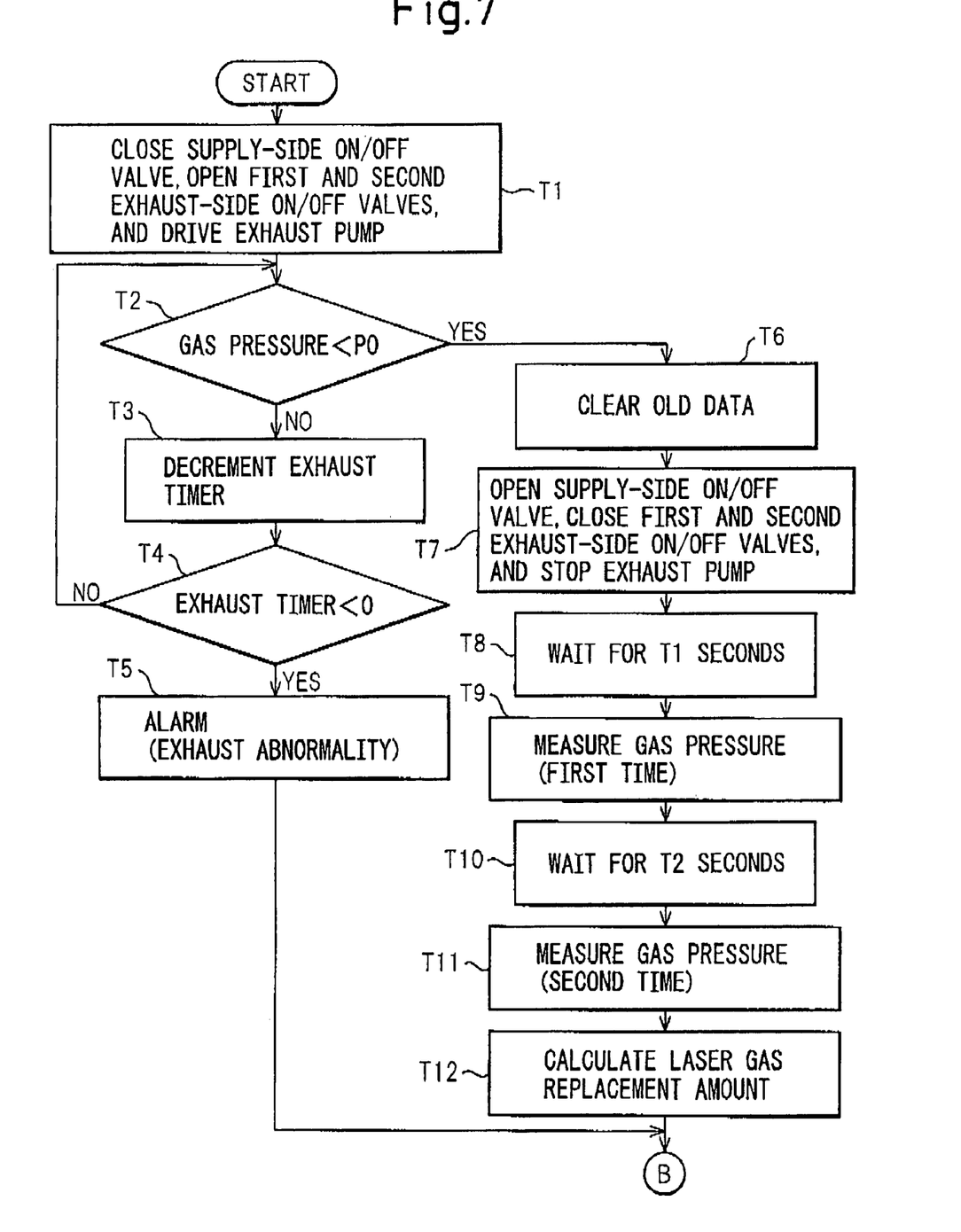
FIGS. 7 and 8 are flowcharts showing a procedure for determining a laser gas replacement amount per unit time based on the laser gas pressure in the gas chamber measured at the time of purging in the gas laser oscillator according to the second embodiment.
Figure 8:
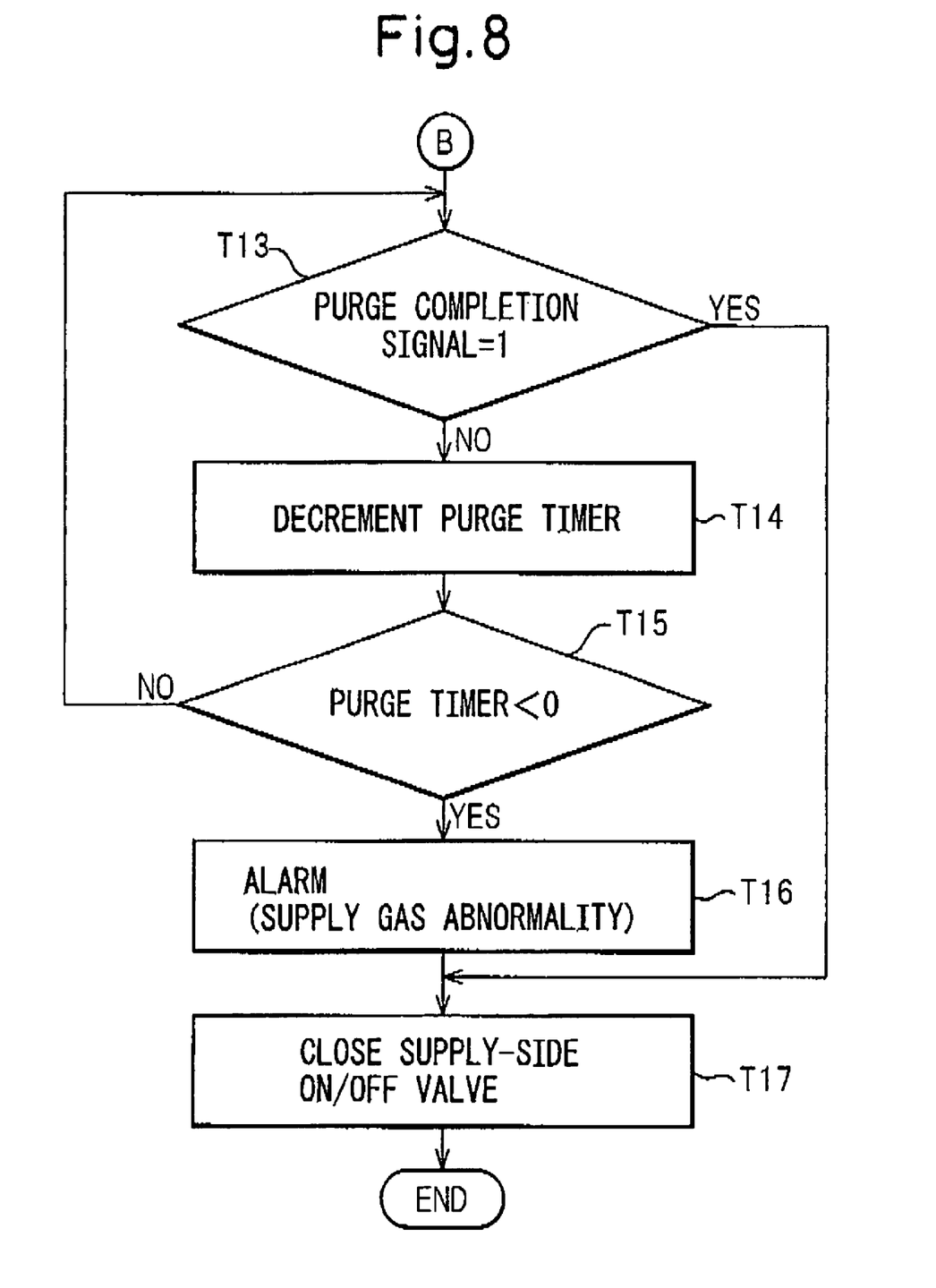

Next, with reference to flowcharts shown in FIGS. 7 and 8, a method of measuring the laser gas replacement amount per unit time in the gas laser oscillator 11' shown in FIG. 5 will be described in detail.

First, in accordance with steps T1 to T5, the gas chamber 13 is vacuumed until the laser gas pressure in the gas chamber 13 decreases to less than a predetermined laser gas pressure set value P0 and, in an abnormality case, an alarm (exhaust abnormality) is displayed on the display device 51. Steps T1 to T5 are exactly the same as steps S1 to S5 shown in FIGS. 3 and 4, and therefore are not described in detail here.

When the laser gas pressure in the gas chamber 13 measured by the gas pressure measuring device 29 decreases to less than the predetermined laser gas pressure set value P0 in step T2, the vacuuming is finished, and the data (the laser gas pressure measurement and the obtained laser gas replacement amount) determined in the previous measurements and stored in the storage device 49 and the old data displayed on the display device 51 is erased (step T6).

When the vacuuming of the gas chamber 13 is finished, the control device 15, in order to start the purging in the gas chamber 13, opens the supply-side on/off valve 37 to supply the laser gas into the gas chamber 13, stops the exhaust pump 41 and closes the first exhaust-side on/off valve 45 and the second exhaust-side on/off valve 47 (step T7). Then, the laser gas pressure in the gas chamber 13 begins to rise. Next, in order to settle the state in the gas chamber 13, the control device 15, after fully closing the first exhaust-side on/off valve 45 and the second exhaust-side on/off valve 47 and then waiting for a predetermined time T1 (for example, 3 seconds) (step T8), makes the gas pressure measuring device 29 measure the laser gas pressure in the gas chamber 13 at time t1 (step T9). The control device 15 receives the laser gas pressure measurement from the gas pressure measuring device 29, stores it in the storage device 49 and displayed on the display device 51. Next, the control device 15, after waiting for a predetermined time T2 (for example, 30 seconds) from the first measurement (step T10), makes the gas pressure measuring device 29 measure the laser gas pressure in the gas chamber 13 at time t2 (step T11). The control device 15 receives the laser gas pressure measurement from the gas pressure measuring device 29, stores it in the storage device 49 and displayed on the display device 51.

After the first and second measurements have been completed, the control device 15, using equation (3), calculates the laser gas replacement amount Q per unit time from the measurements of the laser gas pressure in the gas chamber 13 at time points t1 and t2, the known volume V0 of the gas chamber 13 and the waiting time T2(=t2−t1) in step T10 (step T12). The laser gas replacement amount Q per unit time obtained by the calculation is stored in the storage device 49 and displayed on the display device 51.

Next, the control device 15 confirms the purge completion signal indicating that the pressure in the gas chamber 13 has reached atmospheric pressure and the purging process is complete (step T13). The purge completion signal may be output from a pressure switch (not shown) when the pressure in the gas chamber 13 reaches atmospheric pressure or may be output from the control device 15 when the output from the gas pressure measuring device 29 reaches atmospheric pressure.

When the control device 15 cannot confirm the purge completion signal in step T13, the purge timer is decremented (step T14) and the control device 15 confirms whether or not the value of the purge timer is equal to or more than zero (step T15). If the value of the purge timer is equal to or more than zero in step T15, the purging process is continued and the process returns to step T13 to repeat the process of steps T13 to T15 until the value of the purge timer decreases to less than zero. On the other hand, if the value of the purge timer is less than zero in step T15, it means that the gas chamber 13 is not purged despite the lapse of the preset purge time. Therefore, an alarm (supply gas abnormality) is displayed on the display device 51, and the process proceeds to step T17 described later (step T16). In this case, the leakage from the pipe for supplying the laser gas to the gas chamber 13 and the drop in the laser gas supply source pressure are presumed.

On the other hand, when the control device 15 confirms the purge completion signal in step T13, the process proceeds to step T17 and the supply-side on/off valve 37 is closed to complete the purging process. By this time, the first exhaust-side on/off valve 45 and the second exhaust-side on/off valve 47 have already closed and the exhaust pump 41 has stopped.

In this way, the control device 15 according to the second embodiment can measure, without using a gas flowmeter, the amount of the laser gas replaced in the gas chamber 13 per unit time in the gas laser oscillator 11'. Also, since the laser gas pressure measurement and the laser gas replacement amount per unit time are stored in the storage device 49, they can be displayed and confirmed on the display device 51, if required.

What is claimed is:

1. A gas laser oscillator comprising a gas chamber for containing laser gas, a gas pressure measuring device for measuring pressure in said gas chamber, a supply-side valve for regulating pressure in said gas chamber, and an exhaust-side valve for regulating an exhaust of the laser gas from said gas chamber, said laser gas in said gas chamber being replaced during the time of generating a laser light by exciting the laser gas in said gas chamber, wherein said gas laser oscillator further comprises a laser gas replacement amount measuring device, said laser gas replacement amount measuring device determining the laser gas replacement amount per unit time during the laser oscillating operation based on results of first and second measurements of the pressure in said gas chamber made by said pressure measuring device at a predetermined time interval at the time when the laser gas in said gas chamber is exhausted by closing said supply-side valve with said exhaust-side valve opened.

2. The gas laser oscillator according to claim 1, wherein, when P0 is an average pressure of the laser gas in said gas chamber during the laser oscillating operation, V0 is a volume of said gas chamber, t1 is a time of the first measurement, t2 is a time of the second measurement, P1 is a pressure in said gas chamber measured by said gas pressure measuring device at time t1, P2 is a pressure in said gas chamber measured by said gas pressure measuring device at time t2, and Q is the laser gas replacement amount per unit time, said laser gas replacement amount measuring device determines the laser gas replacement amount Q per unit time from the pressure in said gas chamber measured during the gas exhausting process by the following equation:

$$Q = P0 \cdot V0/(t2-t1) \cdot \ln(P1/P2).$$

3. The gas laser oscillator according to claim 1, further comprising a display device for displaying the laser gas replacement amount per unit time determined by said laser gas replacement amount measuring device.

4. The gas laser oscillator according to claim 3, further comprising a storage device for storing the laser gas replacement amount per unit time determined by said laser gas replacement amount measuring unit, wherein the laser gas replacement amount per unit time stored in said storage device is displayed on said display device.

5. The gas laser oscillator according to claim 2, wherein said laser gas replacement amount measuring device automatically calculates the laser gas replacement amount when the laser gas is exhausted from said gas chamber.

6. A method of measuring a laser gas replacement amount per unit time during a laser oscillating operation in a gas laser oscillator in which a laser gas in a gas chamber is replaced during the time of generating a laser light by exciting the laser gas in said gas chamber, said method characterized by comprising the steps of:

stopping the supply of the laser gas to said gas chamber;

exhausting the laser gas in said gas chamber with the laser gas supply to said gas chamber stopped;

making a first measurement of the pressure in said gas chamber in said exhausting step;

making a second measurement of the pressure in said gas chamber at a predetermined time interval from the first measurement in said exhausting step; and determining the laser gas replacement amount per unit time during the laser oscillation operation, based on the results of the first and second measurements.

7. The method according to claim 6, wherein, when P0 is an average pressure of the laser gas in said gas chamber during the laser oscillating operation, V0 is a volume of said gas chamber, t1 is a time of the first measurement, t2 is a time of the second measurement, P1 is a pressure in said gas chamber measured at time t1, P2 is a pressure in said gas chamber measured at time t2, and Q is the laser gas replacement amount per unit time, the laser gas replacement amount Q per unit time is determined from the pressure in said gas chamber measured during the exhausting step by the following equation:

$$Q = P0 V0/(t2-t1) \cdot \ln(P1/P2).$$

* * * * *